United States Patent
Miwa et al.

(10) Patent No.: US 9,677,528 B2
(45) Date of Patent: Jun. 13, 2017

(54) START CONTROL APPARATUS

(71) Applicant: TOYOTA JIDOSHA KABUSHIKI KAISHA, Toyota-shi, Aichi-ken (JP)

(72) Inventors: Koji Miwa, Susono (JP); Takashi Kawai, Gotemba (JP)

(73) Assignee: TOYOTA JIDOSHA KABUSHIKI KAISHA, Tokyo-Shi (JP)

(*) Notice: Subject to any disclaimer, the term of this patent is extended or adjusted under 35 U.S.C. 154(b) by 61 days.

(21) Appl. No.: 14/786,352

(22) PCT Filed: Apr. 26, 2013

(86) PCT No.: PCT/JP2013/062454
§ 371 (c)(1),
(2) Date: Oct. 22, 2015

(87) PCT Pub. No.: WO2014/174679
PCT Pub. Date: Oct. 30, 2014

(65) Prior Publication Data
US 2016/0069316 A1    Mar. 10, 2016

(51) Int. Cl.
*F02N 11/00* (2006.01)
*F02N 11/08* (2006.01)
(Continued)

(52) U.S. Cl.
CPC ............. *F02N 11/08* (2013.01); *B60K 6/445* (2013.01); *B60W 10/06* (2013.01); *B60W 20/40* (2013.01);
(Continued)

(58) Field of Classification Search
CPC ............. F02N 11/08; F02N 2041/0092; F02D 41/042; F02D 41/062; F02D 41/009;
(Continued)

(56) References Cited

U.S. PATENT DOCUMENTS 6,170,322 B1 * 1/2001 Yamazaki ............. F02D 41/009
  73/114.27
6,378,358 B1 * 4/2002 Hirakata ................. F02D 37/02
  73/114.27
(Continued)

FOREIGN PATENT DOCUMENTS

DE    10062985 A1    7/2002
EP     1344919 A2    9/2003
(Continued)

OTHER PUBLICATIONS

English-language machine translation of Toyota Motor Corp. Japanese Patent Application No. 2007131153A, published May 31, 2007, previously disclosed on Dec. 4, 2015 in the Japanese language with English abstract.

*Primary Examiner* — Hieu T Vo
*Assistant Examiner* — Sherman Manley
(74) *Attorney, Agent, or Firm* — Andrews Kurth Kenyon LLP

(57) ABSTRACT

A start control apparatus is provided with: a crank angle sensor configured to output a signal in association with rotation of an output shaft of an internal combustion engine; a resolver configured to detect a rotor angle, which is an angle position of a rotating shaft of a motor; and a controlling device configured to perform start control associated with the internal combustion engine on the basis of a temporary crank angle, from a start of the internal combustion engine until determination of a crank angle in starting of the internal combustion engine, wherein the temporary crank angle is an estimated value calculated by adding a value according to the outputted signal to a stop angle, which is an angle based on the rotor angle detected at a previous stop of the internal combustion engine.

8 Claims, 12 Drawing Sheets

(51) Int. Cl.
- *B60K 6/445* (2007.10)
- *B60W 10/06* (2006.01)
- *F02D 41/00* (2006.01)
- *F02D 41/04* (2006.01)
- *F02D 41/06* (2006.01)
- *B60W 20/40* (2016.01)

(52) U.S. Cl.
CPC ......... *F02D 41/009* (2013.01); *F02D 41/042* (2013.01); *F02D 41/062* (2013.01); *B60W 2510/0685* (2013.01); *F02D 2041/0092* (2013.01); *F02D 2041/0095* (2013.01); *Y02T 10/6239* (2013.01)

(58) Field of Classification Search
CPC ................ B60W 20/40; B60W 10/06; B60W 2510/0685; B60K 6/445; Y02T 10/6239
See application file for complete search history.

(56) References Cited

U.S. PATENT DOCUMENTS

| | | | | |
|---|---|---|---|---|
| 6,810,860 | B2 * | 11/2004 | Tani | F02D 41/402 123/491 |
| 7,194,899 | B1 * | 3/2007 | Chen | G01P 3/489 73/114.25 |
| 7,942,041 | B2 * | 5/2011 | Takeuchi | F02D 41/009 73/114.26 |
| 2001/0011205 | A1 | 8/2001 | Ando | |
| 2004/0149247 | A1 * | 8/2004 | Kataoka | F02N 11/006 123/179.4 |
| 2004/0153235 | A1 * | 8/2004 | Kataoka | B60K 6/485 701/112 |
| 2005/0278109 | A1 * | 12/2005 | Ando | F02D 41/009 701/112 |
| 2006/0016413 | A1 * | 1/2006 | Satake | F02N 99/008 123/179.4 |
| 2006/0116813 | A1 * | 6/2006 | Tsuyuguchi | F02D 41/009 701/114 |
| 2006/0272611 | A1 * | 12/2006 | Souchon | F02D 35/023 123/299 |
| 2007/0029122 | A1 * | 2/2007 | Suzuki | B60K 6/445 180/65.28 |
| 2007/0062476 | A1 * | 3/2007 | Ota | F02B 23/104 123/179.4 |
| 2008/0010037 | A1 * | 1/2008 | Hashizume | F02D 41/009 702/151 |
| 2008/0047528 | A1 | 2/2008 | Takahashi et al. | |
| 2008/0092841 | A1 * | 4/2008 | Takahashi | F02D 41/009 123/179.16 |
| 2008/0196955 | A1 | 8/2008 | Minamikawa | |
| 2010/0204902 | A1 * | 8/2010 | Kuroki | F02D 41/042 701/103 |
| 2012/0022765 | A1 * | 1/2012 | Tsuji | F02D 41/008 701/103 |
| 2012/0303251 | A1 * | 11/2012 | Shimizu | F02D 13/0238 701/113 |
| 2014/0172219 | A1 * | 6/2014 | Nakanishi | B60K 6/48 701/22 |

FOREIGN PATENT DOCUMENTS

| | | |
|---|---|---|
| JP | 2001020797 A | 1/2001 |
| JP | 2001214790 A | 8/2001 |
| JP | 2005320945 A | 11/2005 |
| JP | 3812195 B2 | 8/2006 |
| JP | 2007131153 A | 5/2007 |
| JP | 4192992 B2 | 12/2008 |
| JP | 4810356 B2 | 11/2011 |

* cited by examiner

IN CASE OF P RANGE

IN CASE OF D RANGE

START CONTROL APPARATUS

CROSS-REFERENCE TO RELATED APPLICATION

This is a national phase application based on the PCT International Patent Application No. PCT/JP2013/062454 filed Apr. 26, 2013, the entire contents of which are incorporated herein by reference.

TECHNICAL FIELD

The present invention relates to a start control apparatus configured to start an internal combustion engine in a vehicle such as, for example, au automobile, which is provided with the internal combustion engine and a motor, and particularly relates to a start control apparatus using an output of a crank angle sensor mounted on the internal combustion engine and an output of a resolver mounted on the motor.

BACKGROUND ART

As this type of apparatus, for example, there is proposed an apparatus configured in such a manner that, in a vehicle provided with an internal combustion engine, a motor generator, and a clutch disposed between the internal combustion engine and the motor generator, an angle difference is calculated between an output shaft of the internal combustion engine and an output shaft of the motor generator if the clutch is once released and is then engaged again, the apparatus being configured to control the internal combustion engine on the basis of the calculated angle difference and the output of a resolver configured to detect an angle position of the output shaft of the motor generator, if the clutch is engaged at the start of the internal combustion engine (refer to Patent Literature 1).

As a method of detecting an angle associated with at least one of the internal combustion engine and the motor, for example, Patent Literature 2 describes such a method that, in a vehicle provided with an internal combustion engine and a motor coupled on a same axis, a crank angle is obtained from an initial phase shift between a crank angle associated with the internal combustion engine detected by a first resolver and a rotor angle associated with the motor detected by a second resolver, and from the rotor angle detected by the second resolver.

Alternatively, Patent Literature 3 describes such a method that a motor generator is controlled by the number of revolutions detected by a resolver in low rotation in which the number of revolutions of the motor generator is less than 100 revolutions per minute (rpm) and that the motor generator is controlled by the number of revolutions detected by a north marker in high rotation. Here, in particular, the Patent Literature 3 describes that in a switching range between the number of revolutions detected by the resolver and the number of revolutions detected by the north marker, switching is prohibited if a change gradient of the number of revolutions is greater than or equal to a predetermined value.

Moreover, as a method of controlling the internal combustion engine on the basis of a detected crank angle, for example, Patent Literature 4 describes such a method that correction is performed to reduce an injection standby period associated with fuel injection by an amount of delay of the output of a sensor signal from an actual detection start time point or end time point of a tooth-missing or chipped-tooth part and teeth parts, due to the tooth-missing part of a signal rotor having the tooth-missing part and the teeth parts, wherein the signal rotor constitutes a crank angle sensor.

CITATION LIST

Patent Literature

Patent Literature 1: Japanese Patent Application Laid Open No. 2001-020797
Patent Literature 2: Japanese Patent No. 3812195
Patent Literature 3: Japanese Patent No. 4192992
Patent Literature 4: Japanese Patent No. 4810356

SUMMARY OF INVENTION

Technical Problem

Here, if the crank angle of a crankshaft, which is the output shaft of the internal combustion engine, is detected by the crank angle sensor, the crank angle is not determined until a reference position of the crank angle is detected by the crank angle sensor. Thus, at the start of the internal combustion engine, for example, fuel injection control or ignition control is hardly performed until the determination of the crank angle. A cranking period is then hardly reduced at the start of the internal combustion engine, and for example, energy efficiency is hardly improved, which is technically problematic.

The technology described in the Patent Literature 1 is hardly applied to an apparatus in which the output shaft of the internal combustion engine is not directly coupled with the output shaft of the motor. Specifically, for example, if a gear is located between the internal combustion engine and the motor, gear backlash of the gear possibly causes an error between the crank angle associated with the internal combustion engine and a value of the resolver indicating the angle position of the output shaft of the motor generator, which possibly reduces accuracy of start control associated with the internal combustion engine.

The technology described in the Patent Literature 2 is a technology of learning a phase shift between the detected crank angle and the detected rotor angle, instead of adjusting an assembled angle of each of the first resolver and the second resolver in such a manner that the detected crank angle matches the detected rotor angle, in the vehicle provided with the internal combustion engine and the motor coupled on the same axis (refer to the Patent Literature 2 [0021] to [0023]). In the technology described in the Patent Literature 2, it is thus extremely hard to solve the aforementioned technical problems.

The technology described in the Patent Literature 3 is, as described above, to switch a number-of-revolutions detecting device according to the number of revolutions of the motor generator. In the technology described in the Patent Literature 3, it is thus extremely hard to solve the aforementioned technical problems. The technology described in the Patent Literature 4 is a technology to improve accuracy of fuel injection start timing after the crank angle is determined by the crank angle sensor. In the technology described in the Patent Literature 4, it is thus extremely hard to solve the aforementioned technical problems.

As described above, in the aforementioned Patent Literatures 1 to 4, it is hard to solve the aforementioned technical problems, which is technically problematic.

In view of the aforementioned problems, it is therefore an object of the present invention to provide a start control apparatus configured to start the internal combustion engine, relatively early, in the vehicle provided with the internal combustion engine and the motor.

Solution to Problem

The above object of the present invention can be achieved by a start control apparatus mounted on a vehicle provided with an internal combustion engine and a motor having a rotating shaft that can be rotated in synchronization with an output shaft of the internal combustion engine, said start control apparatus is provided with: a crank angle sensor mounted on the output shaft and configured to output a signal in association with rotation of the output shaft; a resolver mounted on the rotating shaft and configured to detect a rotor angle, which is an angle position of the rotating shaft; and a controlling device configured to perform start control associated with the internal combustion engine on the basis of a temporary crank angle, from a start of the internal combustion engine until determination of a crank angle, which is an angle position of the output shaft, when the output shaft is rotated by the motor to start the internal combustion engine, wherein the temporary crank angle is an estimated value calculated by adding a value according to the outputted signal to a stop angle, and the stop angle is an angle based on the rotor angle detected at a previous stop of the internal combustion engine.

According to the start control apparatus of the present invention, the start control apparatus is mounted on the vehicle provided with the internal combustion engine, which is, for example, an engine, and the motor having the rotating shaft that can be rotated in synchronization with the output shaft of the internal combustion engine. Here, the expression "that can be rotated in synchronization with" means that the output shaft of the internal combustion engine and the rotating shaft of the motor may be simultaneously rotated or stopped in at least a partial period of a vehicle running period, and is not limited to that the output shaft of the internal combustion engine and the rotating shaft of the motor are always synchronized.

Moreover, the number of revolutions of the output shaft of the internal combustion engine may not be the same as the number of revolutions of the rotating shaft of the motor. It may be sufficient if a known constant of proportionality such as, for example, a gear ratio is used to calculate one of the number of revolutions of the output shaft of the internal combustion engine and the number of revolutions of the rotating shaft of the motor, from the other number of revolutions.

The crank angle sensor is mounted on the output shaft of the internal combustion engine, and outputs the signal in association with the rotation of the output shaft. The resolver is mounted on the rotating shaft of the motor, and detects the rotor angle, which is the angle position of the rotating shaft. Various known aspects can be applied to the crank angle sensor. Moreover, various known aspects can be also applied to the resolver.

The controlling device, which is provided with, for example, a memory, a processor and the like, performs the start control associated with the internal combustion engine on the basis of the temporary crank angle, from the start of the internal combustion engine until the determination of the crank angle, which is the angle position of the output shaft of the internal combustion engine, when the output shaft of the internal combustion engine is rotated (i.e. is cranked) by the motor to start the internal combustion engine. The "temporary crank angle" according to the present invention is the estimated value calculated by adding the value according to the signal outputted from the crank angle sensor at the present start of the internal combustion engine, to the stop angle, which is the angle based on the rotor angle detected by the resolver at the previous stop of the internal combustion engine.

The "start of the internal combustion engine" may not only include a time point of the start of the rotation of the output shaft of the internal combustion engine, but also include a time point going back by a predetermined time or elapsed by a predetermined time from the time point of the start of the rotation of the output shaft. The "determination of the crank angle" means that the crank angle is specified on the basis of the signal outputted from the crank angle sensor.

Until the crank angle is specified from the signal outputted from the crank angle sensor, a certain degree of time is required, as described above. On the other hand, if the crank angle is unknown, it is hard to appropriately perform, for example, fuel injection control, ignition control, or similar control. Therefore, from the viewpoint of the energy efficiency of the entire vehicle, how to reduce a time required for the start of the internal combustion engine leads to an improvement in the energy efficiency. Moreover, in a so-called eco-run vehicle or economical running vehicle, the reduction in the time required for the start of the internal combustion engine leads to an improvement in response.

In particular, in the hybrid vehicle provided with the internal combustion engine and the motor as a power source, in an operating region with a relatively low efficiency of the internal combustion engine such as, for example, during low-speed running and during low-load, the internal combustion engine is stopped and only the motor is used for running in many cases. Thus, in the hybrid vehicle, the internal combustion engine is stopped and is restarted for relatively many times. Then, at the start of the internal combustion engine, there is a relatively large contribution of energy consumed by the motor until the specification of the crank angle, to the entire energy efficiency If a fuel injection process is performed before the determination of the crank angle, for example, only a fixed injection process and a fixed ignition process can be performed because a cylinder number of the internal combustion engine and the crank angle are unknown. Emission deterioration and uncontrollable combustion torque cause an increase in vibration of a power train.

Thus, in the present invention, as described above, by the controlling device, the temporary crank angle is calculated, and the start control associated with the internal combustion engine is performed even before the determination of the crank angle on the basis of the calculated temporary crank angle. In particular, since the signal of the crank angle sensor is outputted if the output shaft of the internal combustion engine is rotated, the use of the temporary crank angle allows the start control associated with the internal combustion engine to be performed immediately after the start of cranking of the internal combustion engine.

As a result, according to the start control apparatus of the present invention, it is possible to start the internal combustion engine, relatively early, in the vehicle provided with the internal combustion engine and the motor.

If there is, for example, a damper, a gear, a belt, or the like between the output shaft of the internal combustion engine and the rotating shaft of the motor, there is possibly deviation between the stop angle at the previous stop of the internal combustion engine and an actual crank angle. Thus, in the present invention, only in a period from the start of the internal combustion engine to the determination of the crank angle, the start control associated with the internal combustion engine is performed by using the temporary crank angle. Then, after the determination of the crank angle, the start control associated with the internal combustion engine is performed by using the crank angle. By virtue of such a configuration, it is possible to start the internal combustion engine, relatively early, while preventing a reduction in accuracy of the start control associated with the internal combustion engine.

Immediately before the stop of the internal combustion engine, torque reaction due to compression torque of the internal combustion engine causes the reverse rotation of the internal combustion engine. It is thus hard to detect the stop angle associated with the internal combustion engine only by using a general crank angle sensor. On the other hand, instead of using the "temporary crank angle" according to the present invention, a sensor with a reverse rotation detection function is considered to be used to detect the crank angle; however, the sensor with the reverse rotation detection function is relatively expensive, and there is thus a problem such as, for example, an increase in manufacturing cost.

In one aspect of the start control apparatus of the present invention, if the output shaft is rotated between the previous stop of the internal combustion engine and a present start of the internal combustion engine, said controlling device updates the stop angle on the basis of a rotor angle detected again by said resolver, and uses the updated stop angle at the present start of the internal combustion engine, thereby calculating the temporary crank angle.

The resolver can detect the rotor angle not only when the rotating shaft of the motor is rotated in a forward direction but also when the rotating shaft is rotated in a reverse direction. Thus, even if the rotation of the output shaft of the internal combustion engine causes the rotating shaft of the motor to be rotated, the rotor angle can be detected, regardless of a rotational direction of the rotating shaft of the motor.

Therefore, the stop angle of the output shaft at the present start of the internal combustion engine is known even if the output shaft of the internal combustion engine is rotated due to disturbance such as, for example, vibration during running, between the previous stop of the internal combustion engine and the present start. It is thus possible to calculate the temporary crank angle with relatively high reliability, which is extremely useful in practice.

In another aspect of the start control apparatus of the present invention, in a case where a time point of a start of the rotation of the rotating shaft and a time point of a start of the rotation of the output shaft are different due to a power transmission mechanism located between the output shaft and the rotating shaft, said controlling device updates the stop angle on the basis of a rotor angle detected again by said resolver, and adds the value according to the outputted signal to the stop angle at the time point of the start of the rotation of the output shaft, thereby calculating the temporary crank angle.

According to this aspect, even if the time point of the start of the rotation of the rotating shaft and the time point of the start of the rotation of the output shaft are different due to gear backlash elimination in the power transmission mechanism or the like, the temporary crank angle with relatively high reliability can be calculated, which is extremely useful in practice.

Particularly in this aspect, even after it is required to start the internal combustion engine and the rotating shaft of the motor starts to be rotated, the stop angle is updated until the start of the rotation of the output shaft of the internal combustion engine.

In this aspect, the case where the time point of the start of the rotation of the rotating shaft and the time point of the start of the rotation of the output shaft are different due to the power transmission mechanism located between the output shaft and the rotating shaft is a case where a parking range is selected by a shift operating device, which is provided for the vehicle and which is configured to switch between a plurality of ranges including the parking range.

By virtue of such a configuration, for example, if the parking range that easily allows control associated with the gear backlash elimination or the like is selected, it is possible to appropriately calculate the temporary crank angle to start the internal combustion engine.

In another aspect of the start control apparatus of the present invention, said controlling device corrects a value according to a first signal outputted, on the basis of a period from a start of the rotation of the output shaft to an output of the first signal from said crank angle sensor.

The output shaft of the internal combustion engine is provided with a rotor having a plurality of teeth parts (and a plurality of slits). The rotor is provided with a tooth-missing part in which only one space between adjacent teeth parts is widen, as a marker for detecting a reference position of the output shaft. The crank angle sensor outputs the signal according to a gap between the crank angle sensor and the rotor.

If the tooth-missing part of the rotor is opposed to the crank angle sensor at the previous stop of the internal combustion engine, there is a relatively long period from the present start of the internal combustion engine to the output of the first signal from the crank angle sensor. If the temporary crank angle is calculated without consideration of the tooth-missing part, there is possibly a relatively large difference between the calculated temporary crank angle and the actual crank angle.

In this aspect, however, as described above, by the controlling device, the value according to the first signal outputted is corrected on the basis of the period from the start of the rotation of the output shaft to the output of the first signal from the crank angle sensor. It is thus possible to suppress the deviation between the calculated temporary crank angle and the actual crank angle, which is extremely useful in practice.

In another aspect of the start control apparatus of the present invention, said controlling device performs the start control on the basis of the crank angle instead of the temporary crank angle after the determination of the crank angle, and if the crank angle is advanced from the temporary crank angle when the crank angle is determined, said controlling device performs fuel injection control or ignition control on condition that an injection angle to perform the fuel injection control included in the start control, or an ignition angle to perform the ignition control included in the start control is included between the temporary crank angle and the crank angle.

According to this aspect, it is possible to prevent skipped processing caused by switching from the temporary crank angle to the crank angle, which is extremely useful in practice.

If the injection angle or the ignition angle is included between the temporary crank angle and the crank angle, the controlling device performs the fuel injection control or the ignition control, typically immediately after the switching from the temporary crank angle to the crank angle.

Alternatively, in another aspect of the start control apparatus of the present invention, said controlling device performs the start control on the basis of the crank angle instead of the temporary crank angle after the determination of the crank angle, and if the crank angle is delayed from the temporary crank angle when the crank angle is determined, said controlling device prohibits fuel injection control and ignition control, which are included in the start control, until the crank angle reaches an angle corresponding to the temporary crank angle when the crank angle is determined.

According to this aspect, it is possible to prevent double processing caused by the switching from the temporary crank angle to the crank angle, which is extremely useful in practice.

The "controlling device prohibits fuel injection control and ignition control, which are included in the start control, until the crank angle reaches the angle corresponding to the temporary crank angle when the crank angle is determined" means that the controlling device prohibits the fuel injection control and the ignition control even if at least one of the injection angle and the ignition angle is included between the crank angle and the temporary crank angle when the crank angle is determined.

The controlling device performs the fuel injection control or the ignition control if the crank angle corresponds to the injection angle or the ignition angle after the crank angle reaches the angle corresponding to the temporary crank angle when the crank angle is determined.

In another aspect of the start control apparatus of the present invention, if it is required to reduce emission at the start of the internal combustion engine, said controlling device performs the start control on the basis of the crank angle after the determination of the crank angle, without using the temporary crank angle.

According to this aspect, if the early start of the internal combustion engine possibly deteriorates emission, such as, for example, during a long intermittent operation time, during relatively low catalyst temperature, and at the start of the operation of the vehicle, then, the start control associated with the internal combustion engine is performed after the determination of the crank angle. It is thus possible to suppress the emission deterioration.

The operation and other advantages of the present invention will become more apparent from embodiments explained below.

DESCRIPTION OF EMBODIMENTS

Hereinafter, embodiments according to the start control apparatus of the present invention will be explained with reference to the drawings.

<First Embodiment>

A first embodiment according to the start control apparatus of the present invention will be explained with reference to FIG. 1 to FIG. 7.

Figure 1:
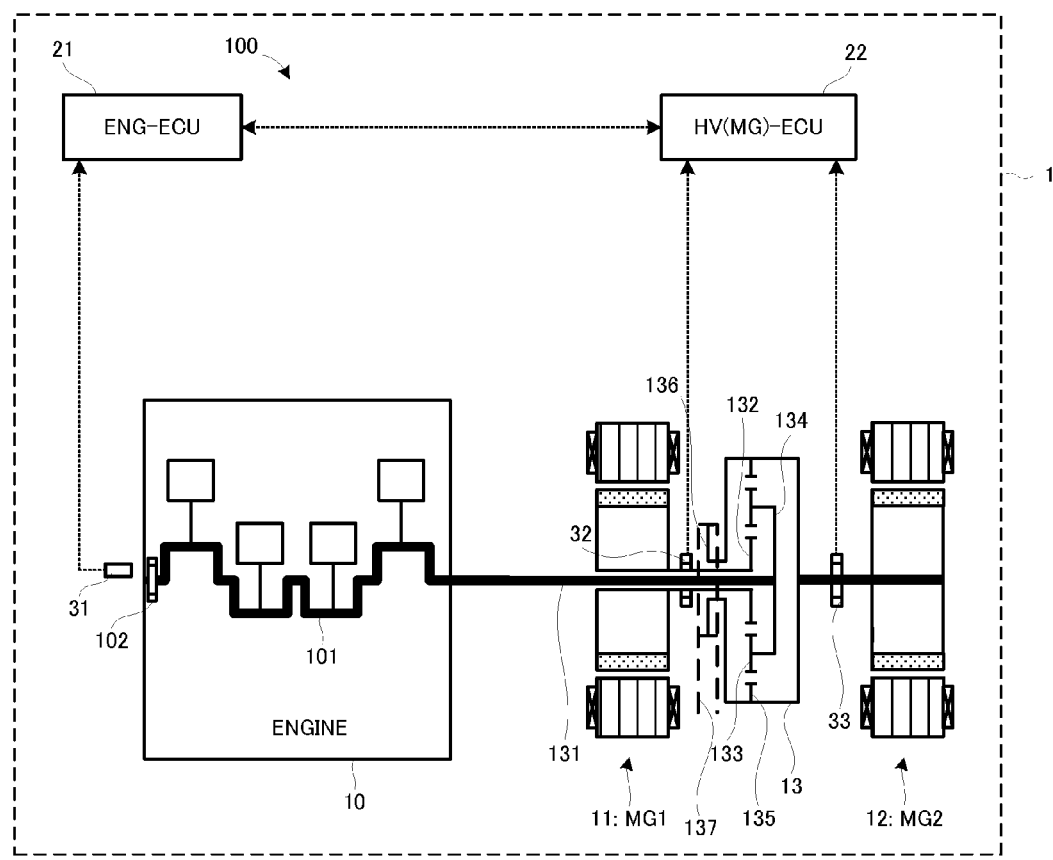
FIG. 1 is a block diagram illustrating a configuration of a vehicle on which a start control apparatus according to a first embodiment is mounted.

Firstly, a vehicle on which the start control apparatus according to the embodiment is mounted will be explained with reference to FIG. 1. FIG. 1 is a block diagram illustrating a configuration of the vehicle on which the start control apparatus according to the first embodiment is mounted. In FIG. 1, illustration of a constituent that is not directly related to the present invention is omitted, as occasion demands, to avoid a complicated explanation.

In FIG. 1, a hybrid vehicle 1 is provided with an engine 10, a first motor generator (MG1) 11, a second motor generator (MG2) 12, a power distribution mechanism 13 having a planetary gear mechanism, an engine electronic control unit (ECU) 21, and a hybrid ECU 22.

A crankshaft 101 of the engine 10 is connected to an input shaft 131, which is a rotating shaft of a planetary carrier 134. The planetary carrier 134 is a carrier for a plurality of planetary gears 133 of the power distribution mechanism 13.

The engine 10 according to the embodiment is a four-cylinder engine having four cylinders; however, the engine 10 is not limited to the four-cylinder engine, and may be various engines such as, for example, a six-cylinder, eight-cylinder, 12-cylinder, or 16 cylinder engine.

A rotating shaft of a sun gear 132 of the power distribution mechanism 13 is connected to the first motor generator 11. A rotating shaft of a ring gear 135 of the power distribution mechanism 13 is connected to the second motor generator 12. A power output gear 136 of the power distribution mechanism 13 transmits power to a power transmission gear (not illustrated) via a chain belt 137. The power transmitted to the power transmission gear is transmitted to drive wheels (not illustrated) of the hybrid vehicle 1 via a drive shaft and a differential gear (not illustrated).

The hybrid vehicle 1 is further provided with a crank angle sensor 31 and resolvers 32 and 33.

Here, on the crankshaft 101 of the engine 10, there is provided a crank rotor 102 configured to rotate with the crankshaft 101 and having projections (or notches) on its peripheral portion. The crank angle sensor 31 has a pickup configured to generate a pulse signal when the projection of the crank rotor 102 passes by.

Figure 2:
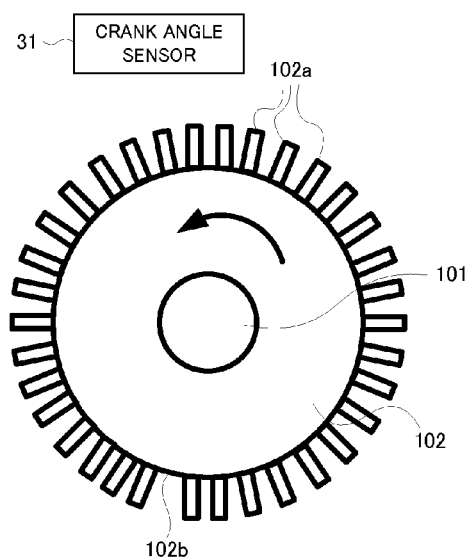
FIG. 2 is a configuration diagram schematically illustrating a configuration of a crank angle sensor according to the first embodiment.
Figure 3:
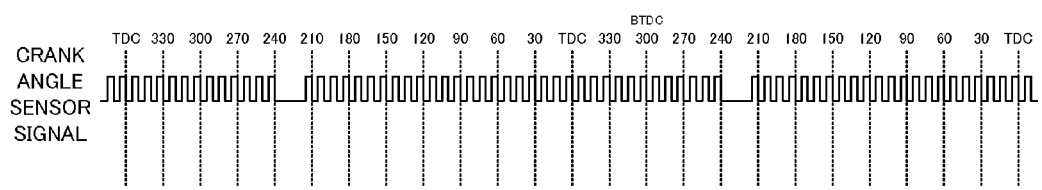
FIG. 3 is a diagram illustrating one example of a crank angle sensor signal.

Now, the crank angle sensor 31 will be explained with reference to FIG. 2 and FIG. 3. FIG. 2 is a configuration diagram schematically illustrating a configuration of the crank angle sensor according to the first embodiment. FIG. 3 is a diagram illustrating one example of a crank angle sensor signal.

In FIG. 2, on the crankshaft 101, there is mounted the crank rotor 102, which rotates in an illustrated arrow direction. On an outer circumference of the crank rotor 102, there are provided teeth parts 102a formed at equal angle intervals such as, for example, at intervals of 10 degree crank angles (CA), and a tooth-missing part 102b in which two teeth are missing in a row, in order to detect a crank angle.

The crank angle sensor 31 is opposed to each of the teeth parts 102a and detects a rotation angle of the crankshaft 101 by using the teeth parts 102a. A crank angle sensor signal outputted from the crank angle sensor 31 is a pulse signal having a cycle that is a period of rotation by a predetermined crank angle (e.g. 10 degree CA), when a rotational position of the crank shaft 101 is not a preset particular position. The crank angle sensor signal is a tooth-missing signal having a cycle that is a period of the rotation of the crankshaft 101, for example, by 30 degree CA, when the crankshaft 101 is at the particular position. The tooth-missing signal is generated at each time of one revolution of the crankshaft 101 (i.e. at intervals of 360 degree CA).

As illustrated in FIG. 3, the tooth-missing part 102b is detected once at each time of one revolution of the crank rotor 102 (i.e. the crankshaft 101). In a four-stroke engine in which two revolutions of the crankshaft 101 makes one cycle, in order to determine whether a top dead center (TDC) is an intake TDC or a combustion TDC, an absolute angle of the crankshaft 101 is specified, for example, by using a cam signal outputted from a cam sensor (not illustrated) installed on a cam shaft of a valve system in which one cycle is one revolution, in addition to the crank angle sensor signal (refer to FIG. 4).

Figure 4:
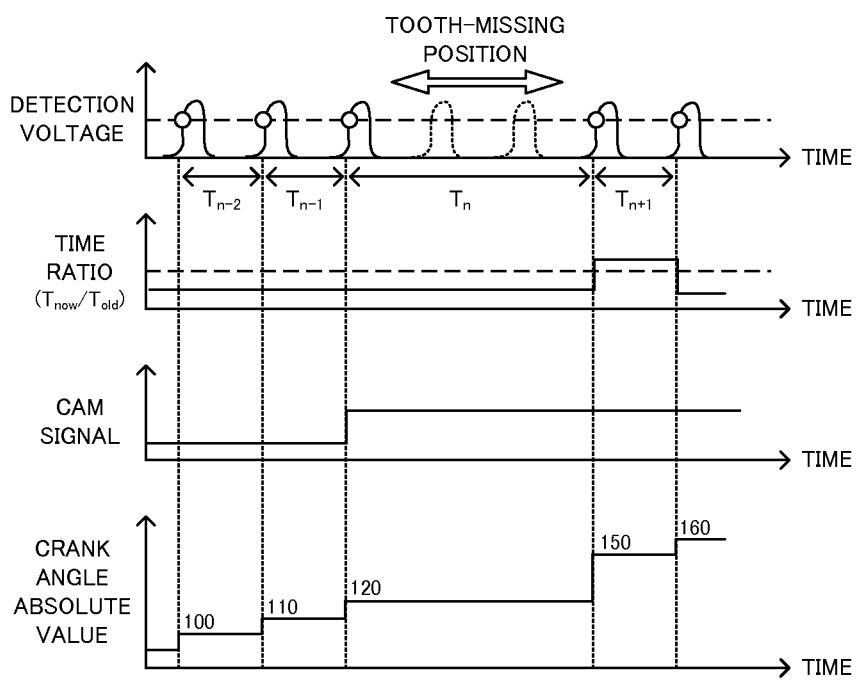
FIG. 4 is a conceptual diagram illustrating one example of a method of specifying an absolute value of a crank angle.

FIG. 4 is a conceptual diagram illustrating one example of a method of specifying an absolute value of the crank angle. In FIG. 4, a first graph at the top corresponds to the crank angle sensor signal. Since various known aspects can be applied to the method of specifying the absolute value of the crank angle, the details of the method will be omitted in order to avoid a complicated explanation.

Back in FIG. 1, the engine ECU 21 and the hybrid ECU 22 communicate with each other, for example, by controller area network (CAN) communication.

Here, fuel injection control and ignition control associated with the engine 10 are performed according to the crank angle. However, at the start of the engine 10, in a period from the start of the rotation of the crankshaft 101 until determination (or specification) of the crank angle, the fuel injection control or the ignition control is hardly performed with the same accuracy as that in a period after the determination of the crank angle.

Thus, in such a configuration that the fuel injection control or the ignition control is performed after the determination of the crank angle at the start of the engine 10, a time required for the start of the engine 10 increases. Then, response possibly decreases in a so-called eco-run vehicle, and a power consumption amount for cranking the engine 10 possibly increases in a hybrid vehicle.

On the other hand, if the fuel injection control or the ignition control is performed before the determination of the crank angle, a fixed injection process or a fixed ignition process is performed because a cylinder number and the crank angle are unknown. That possibly deteriorates emission, and possibly increases vibration of a power train because combustion torque cannot be controlled.

As a method of relatively accurately performing the fuel injection control or the ignition control before the determination of the crank angle, the following two methods can be considered.

Firstly, in order to determine the crank angle at the present start of the engine 10, the crank angle at the previous stop of the engine 10 is accurately detected. Immediately before the stop of the engine 10, however, torque reaction due to compression torque causes the reverse rotation of the crankshaft 101 of the engine 10. Thus, a sensor with a reverse rotation detection function is required. The sensor with the reverse rotation detection function is relatively expensive, and this method thus has a technical problem such as, for example, an increase in manufacturing cost.

Secondly, information about the sensor with the reverse rotation detection function (e.g. the resolver) provided for the motor generator is substituted for the crank angle. However, the angle of a rotating shaft of the motor generator does not necessarily match the angle of the crankshaft 101 in some cases. Specifically, for example, in the eco-run vehicle and the hybrid vehicle (refer to FIG. 1) having the motor generator coupled with the crankshaft 101, for example, by a damper, a gear, a belt or the like, the angle of the rotating shaft of the motor generator possibly deviates from the crank angle due to the damper or the like. It is therefore hard to accurately perform the fuel injection control or the ignition control by using only the information about the angle of the rotating shaft of the motor generator, which is technically problematic.

Moreover, even if the crankshaft 101 and the rotating shaft of the motor generator are directly coupled, if the engine ECU 21 configured to control the engine 10 and the hybrid ECU 22 configured to control the motor generator are separately provided as in the vehicle 1 according to the embodiment, the angle of the rotating shaft of the motor generator deviates from the crank angle due to communication delay between the ECUs, which reduces control accuracy.

Thus, in the start control apparatus 100 according to the embodiment, start control associated with the engine 10 is performed on the basis of a temporary crank angle, from the start of the engine 10 until the determination of the crank angle, at the start of the engine 10. Here, the temporary crank angle is an estimated value calculated by adding a value according to the crank angle sensor signal outputted from the crank angle sensor 31, to a stop angle, which is an angle based on a rotor angle associated with the first motor generator 11 detected by the resolver 32 at the previous stop of the engine 10. The "value according to the crank angle sensor signal" is basically 10 degrees (refer to FIG. 2) in the embodiment.

By virtue of such a configuration, the fuel injection control or the ignition control is performed on the basis of the temporary crank angle even before the determination of the crank angle. In addition, the crank angle sensor 31 is not necessarily provided with the reverse rotation detection function, and it is thus possible to suppress, for example, the increase in manufacturing cost.

Figure 5A:
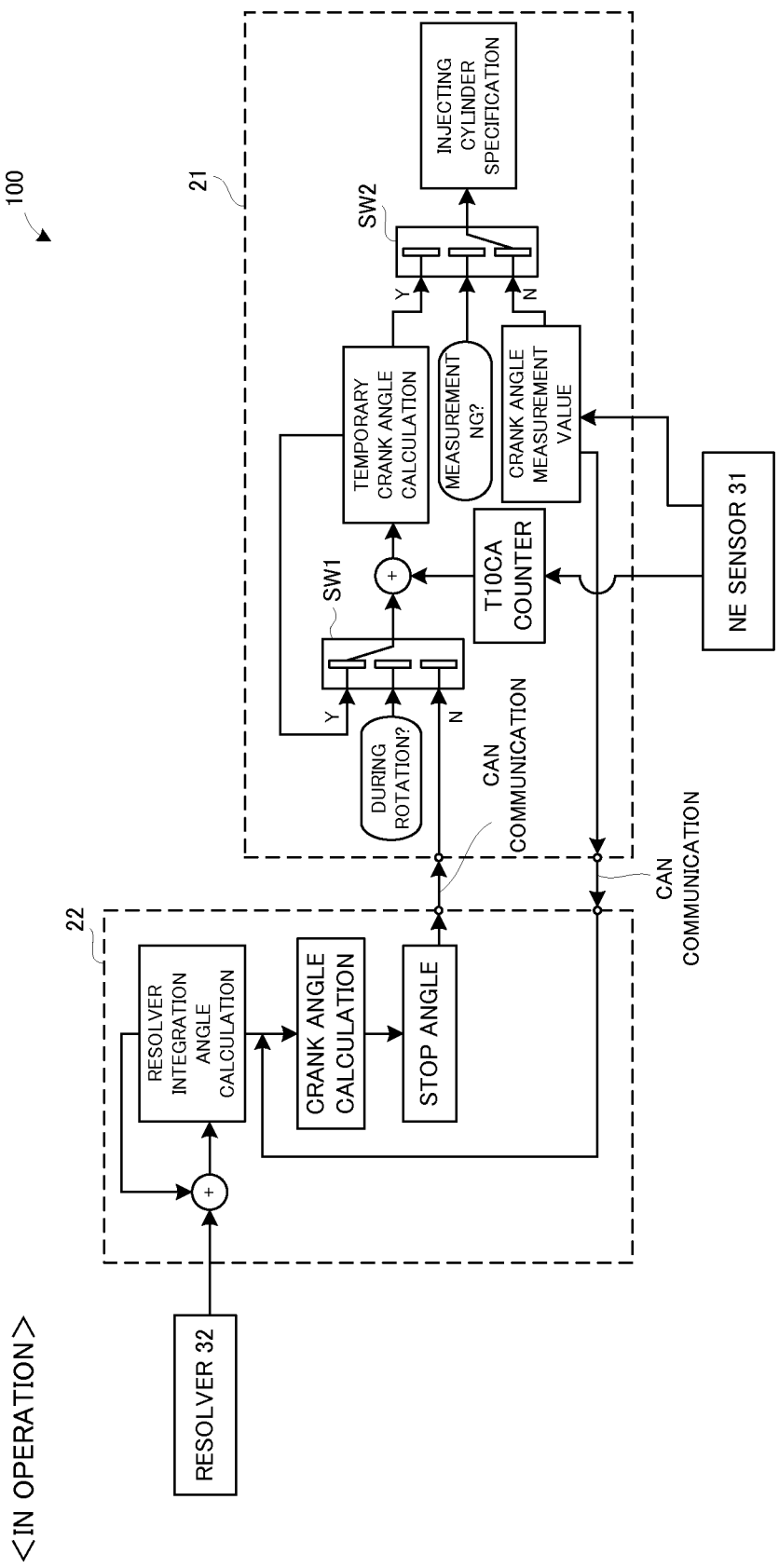
FIG. 5A is a conceptual diagram illustrating an operation of the start control apparatus when an engine is operated.
Figure 5B:
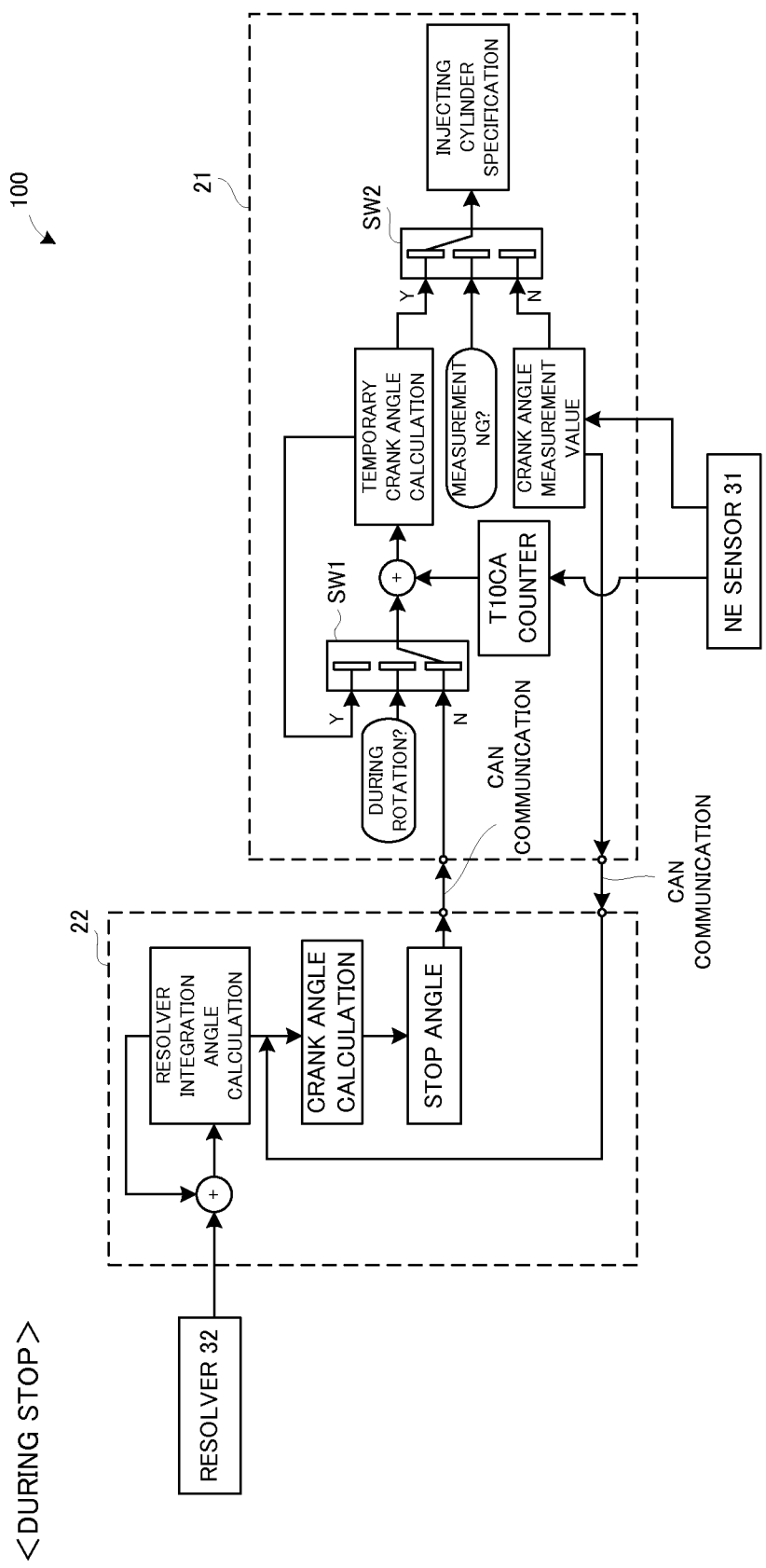
FIG. 5B is a conceptual diagram illustrating an operation of the start control apparatus when the engine is stopped.
Figure 5C:
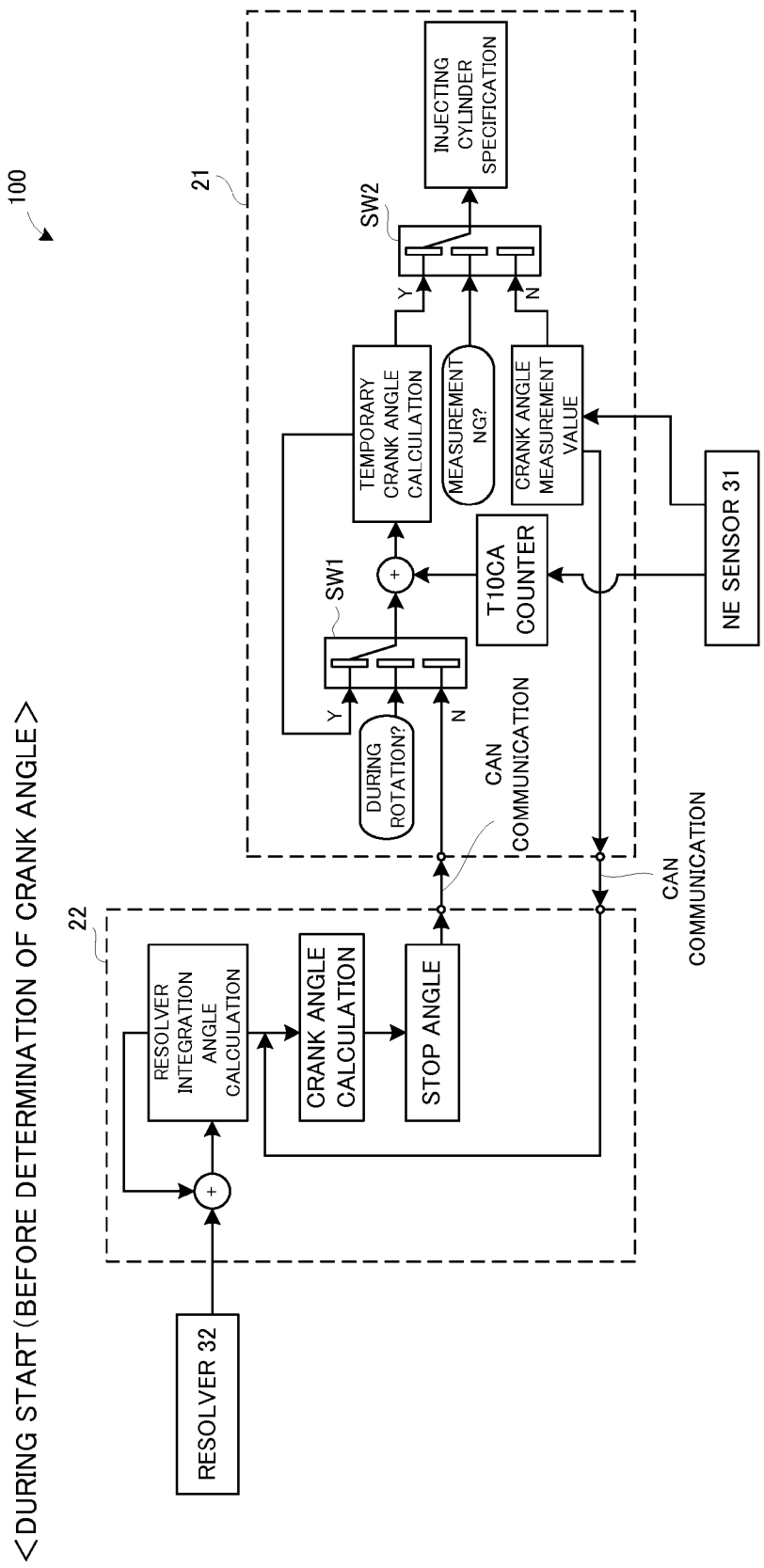
FIG. 5C is a conceptual diagram illustrating an operation of the start control apparatus at the start of an engine and before determination of the crank angle.

Next, specific operations of the start control apparatus 100 according to the embodiment will be explained with reference to FIG. 5A, FIG. 5B, and FIG. 5C. FIG. 5A is a conceptual diagram illustrating the operation of the start control apparatus when the engine is operated. FIG. 5B is a conceptual diagram illustrating the operation of the start control apparatus when the engine is stopped. FIG. 5C is a conceptual diagram illustrating the operation of the start control apparatus at the start of the engine and before the determination of the crank angle.

In FIG. 5A, the start control apparatus 100 is provided with the engine ECU 21, the hybrid ECU 22, the crank angle sensor 31, and the resolver 32.

In operation of the engine 10, the crank angle is determined. Thus, a switch SW2 of the engine ECU 21 is connected to an "N" side. Therefore, the crank angle is measured (refer to "CRANK ANGLE MEASUREMENT VALUE") on the basis of the crank angle sensor signal from the crank angle sensor 31, and a cylinder is specified on the basis of the measured crank angle, and the fuel injection control or the ignition control is performed. Moreover, the engine ECU 21 transmits the crank angle or a TDC signal to the hybrid ECU 22 by the CAN communication (or directly).

In the hybrid ECU 22, an integration angle is calculated (refer to "RESOLVER INTEGRATION ANGLE CALCULATION") on the basis of the rotor angle associated with the first motor generator 11 detected by the resolver 32. In the hybrid ECU 22, the crank angle is further calculated on the basis of the calculated integration angle. At this time, the calculated crank angle is corrected or reset, or the like, on the basis of the crank angle or the TDC signal transmitted from the engine ECU 21.

At the stop of the engine 10, the hybrid ECU 22 stores the crank angle calculated at that time, as the stop angle. Immediately before the stop of the engine 10, the hybrid ECU 22 may correct the calculated crank angle on the basis of the crank angle transmitted from the engine ECU 21.

Then, during the stop of the engine 10, the crankshaft 101 of the engine 10 is stopped. Thus, a switch SW1 of the engine ECU 21 is connected to the "N" side. If it is required to start the engine 10, the hybrid ECU 22 transmits the crank angle stored as the stop angle, to the engine ECU 21 by the CAN communication before the crankshaft 101 of the engine 10 is rotated by the first motor generator 11. The engine ECU 21 sets the transmitted crank angle as an initial value of the temporary angle.

Then, at the start of the engine 10 and before the determination of the crank angle, the crankshaft 101 of the engine 10 rotates. Thus, the switch SW1 of the engine ECU 21 is connected to a "Y" side. Therefore, the temporary crank angle is updated (refer to "T10 CA COUNTER", "TEMPORARY CRANK ANGLE CALCULATION", etc.) on the basis of the crank angle sensor signal from the crank angle sensor 31.

Moreover, since the crank angle is not determined, the switch SW2 of the engine ECU 21 is connected to the "Y" side. Thus, the cylinder is specified on the basis of the temporary crank angle, and the fuel injection control or the ignition control is performed.

Figure 6:
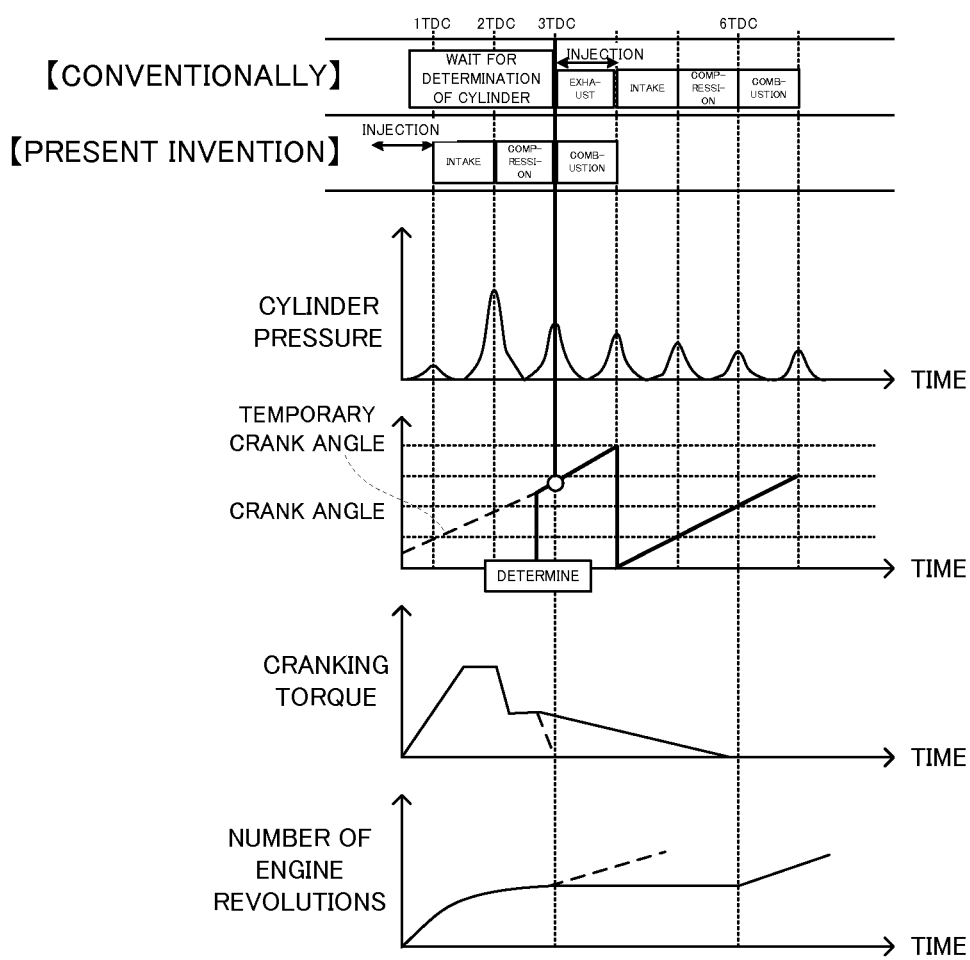
FIG. 6 is a conceptual diagram illustrating start control according to the first embodiment, in comparison with start control according to a conventional example.

Next, an effect of the embodiment will be explained with reference to FIG. 6. FIG. 6 is a conceptual diagram illustrating the start control according to the first embodiment, in comparison with start control according to a conventional example.

In FIG. 6, in the conventional example, the fuel injection control or the ignition control cannot be performed until the determination of the crank angle (refer to "DETERMINE" in FIG. 6). In contrast, in the embodiment (refer to "PRESENT INVENTION") in FIG. 6), the temporary crank angle is used, so that the fuel injection control or the ignition control can be performed immediately after the start of the engine 10. This can result in the relatively early start of the engine 10 (3TDC earlier than the conventional example).

In addition, the cranking period can be also reduced (refer to a dashed line in the second lowest graph of FIG. 6), and it is thus possible to reduce the power consumption amount associated with the cranking, thereby improving energy efficiency.

A start control process performed mainly during running of the hybrid vehicle 1 provided with the start control apparatus 100 as configured above will be explained with reference to a flowchart in FIG. 7.

Figure 7:
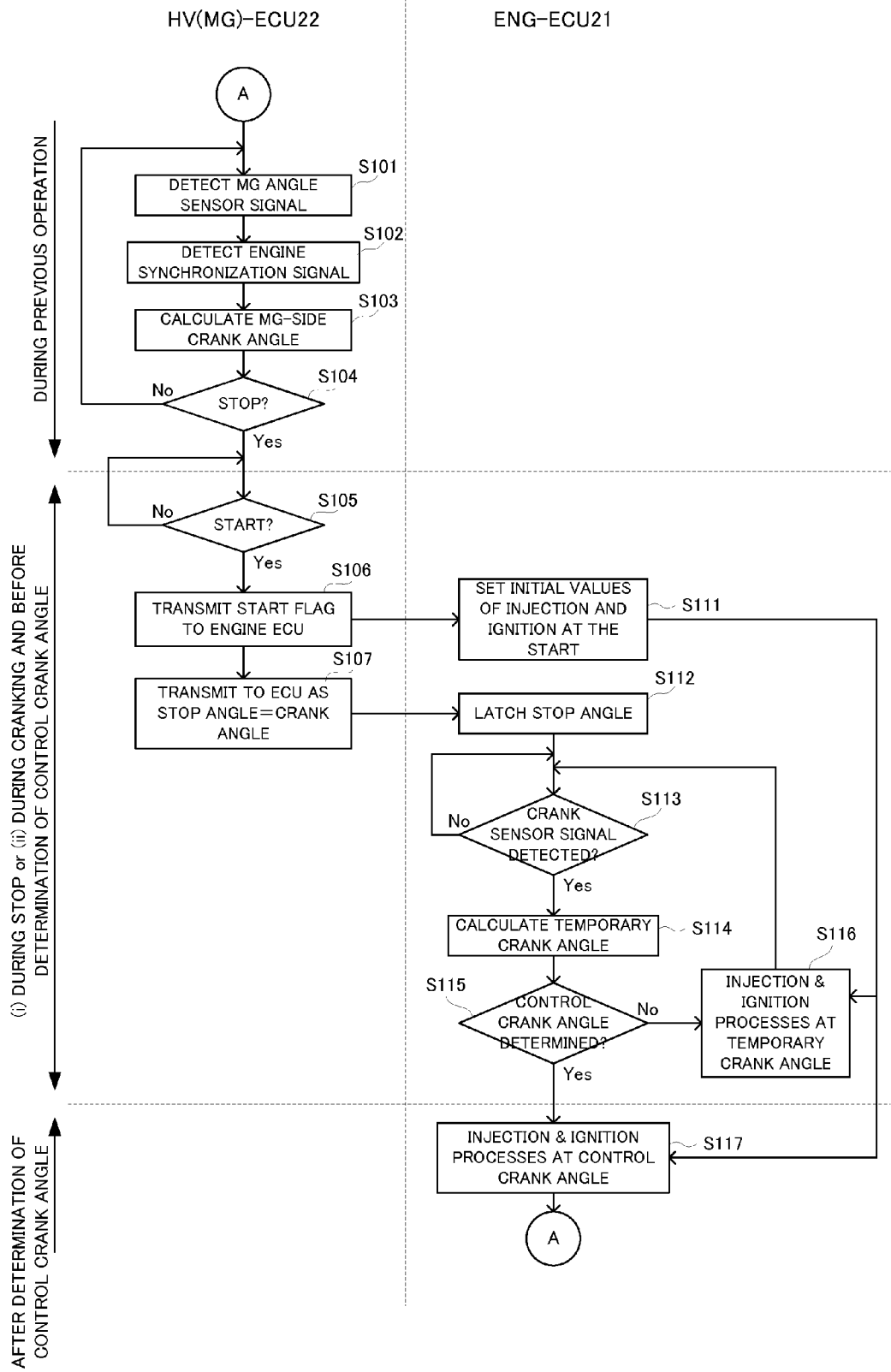
FIG. 7 is a flowchart illustrating a start control process according to the first embodiment.

In FIG. 7, during previous operation of the engine 10, the hybrid ECU 22 detects a signal outputted from the resolver 32 (step S101). In parallel with the process in the step S101, the hybrid ECU 22 detects an engine synchronization signal (step S102).

Here, the engine synchronization signal is, for example, a 30 degree CA signal outputted from the crank angle sensor 31, or the like. Since various known aspects can be applied to the engine synchronization signal, the details of the engine synchronization signal will be omitted.

The hybrid ECU 22 then calculates the crank angle on the basis of the signal outputted from the resolver 32 (step S103). The steps S101 and S103 respectively correspond to "RESOLVER INTEGRATION ANGLE CALCULATION" and "CRANK ANGLE CALCULATION" in FIG. 5A.

The hybrid ECU 22 then determines whether or not the engine 10 is stopped (step S104). If it is determined that the engine 10 is not stopped (the step S104: No), the hybrid ECU 22 performs the process in the step S101. If, however, it is determined that the engine 10 is stopped (the step S104: Yes), the hybrid ECU 22 stores the calculated crank angle as the stop angle.

The hybrid ECU 22 then determines whether or not it is required to start the engine 10 (step S105). If it is determined that the start is not required (the step S105: No), the hybrid ECU 22 performs the process in the step S105 (i.e. becomes in a standby state until the start is required).

If, however, it is determined that the start is required (the step S105: Yes), the hybrid ECU 22 transmits an engine start flag to the engine ECU 22 (step 106). The engine ECU 21 that receives the engine start flag sets initial values of an injection angle to perform the fuel injection control and of an ignition angle to perform the ignition control at the start of the engine 10 (step S111).

Moreover, the hybrid ECU 22 transmits the crank angle stored as the stop angle, to the engine ECU 21 (step S107). The engine ECU 21 latches the received crank angle (or the stop angle) (step S112). The engine ECU 21 then determines whether or not the crank angle sensor signal is detected (step S113).

If it is determined that the crank angle sensor signal is not detected (the step S113: No), the engine ECU 21 performs the process in the step S103 (i.e. becomes in the standby state until the crank angle sensor signal is detected). If, however, it is determined that the crank angle sensor signal is detected (the step S113: Yes), the engine ECU 21 calculates the temporary crank angle from the value according to the crank angle sensor signal and from the latched stop angle (step S114).

The engine ECU 21 then determines whether or not the crank angle is determined (step S115). If it is determined that the crank angle is not determined (the step S115: No), the engine ECU 21 performs the fuel injection control or the ignition control on condition that the temporary crank angle corresponds to the injection angle or the ignition angle, on the basis of the temporary crank angle (step S116), and performs the process in the step S113 again.

If, however, it is determined that the crank angle is determined (the step S115: Yes), the engine ECU 21 performs the fuel injection control or the ignition control on condition that the crank angle corresponds to the injection angle or the ignition angle, on the basis of the crank angle instead of the temporary crank angle (step S117).

The "engine ECU 21" and the "hybrid ECU 22" according to the embodiment are one example of the "controlling device" according to the present invention. In other words, in the control start apparatus 100 according to the embodiment, a part of the functions of the engine ECU 21 and the hybrid ECU 22 for various electronic controls of the hybrid vehicle 1 is used as a part of the start control apparatus 100.

In the process in the step S112, if the crankshaft 101 starts to be rotated before the stop angle is latched, for example, the engine ECU 21 stores a rotation amount of the crankshaft 101 on the basis of the crank angle sensor signal and calculates the temporary crank angle from the recorded or stored rotation angle and from the latched stop angle at a time point at which the stop angle is latched.

<Second Embodiment>

Figure 8:
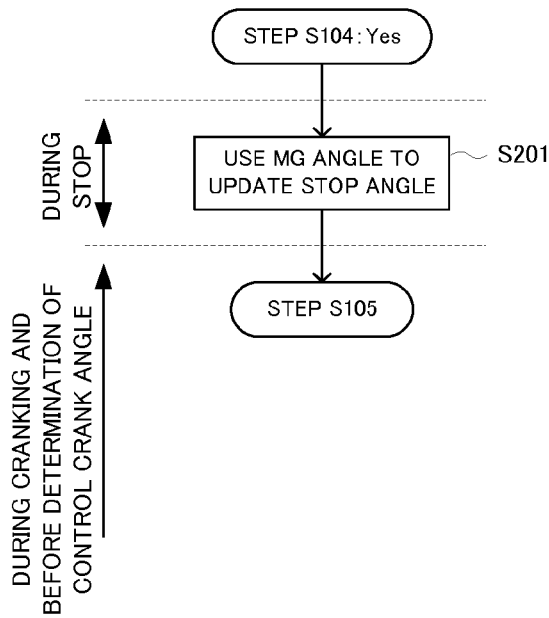
FIG. 8 is a flowchart illustrating a start control process according to a second embodiment.

A second embodiment according to the start control apparatus of the present invention will be explained with reference to FIG. 8. The second embodiment has the same configuration as that of the first embodiment, except that a part of the start control process is different. Therefore, an explanation of the same part as that in the first embodiment will be omitted, as described above, and the same portions as those on the drawing will carry the same reference numerals. Basically, only a different part will be explained with reference to FIG. 8.

During the running of the hybrid vehicle 1, even if the engine 10 is stopped, the crankshaft 101 is rotated in some cases due to disturbance such as vibration transmitted via wheels (not illustrated) of the hybrid vehicle 1.

The crank angle sensor 31, however, cannot determine whether the crankshaft 101 is rotated in a forward direction or in a reverse direction. Moreover, depending on how to rotate the crankshaft 101, even a part that is not the tooth-missing part 102b (refer to FIG. 2) is possibly erroneously recognized as the tooth-missing part 102 from the outputted crank angle sensor signal.

Thus, in the embodiment, if the crankshaft 101 is rotated during the stop of the engine 10, the crank angle stored as the stop angle is updated on the hybrid ECU 22 on the basis of the rotor angle detected by the resolver 32, without using the crank angle sensor 31.

By virtue of such a configuration, even if the crankshaft 101 is rotated due to the disturbance during the stop of the engine 10, it is possible to improve reliability of the temporary crank angle at the start of the engine 10, which is extremely useful in practice.

A start control process performed by the start control apparatus 100 as configured above will be explained with reference to a flowchart in FIG. 8.

After the determination of "Yes" in the process in the step S104 illustrated in FIG. 7 (i.e. after the determination that the engine 10 is stopped and the storage of the stop angle), the hybrid ECU 22 updates the stored stop angle on condition that the rotor angle is detected again by the resolver 32 (i.e. the crankshaft 101 is rotated, and the rotation of the crankshaft 101 causes the rotating shaft of the first motor generator 11 to be rotated) (step S201).

The hybrid ECU 22 then performs the process in the step S105 illustrated in FIG. 7. If it is determined to be "No" in the process in the step S105, the hybrid ECU 22 performs the process in the step S201.

<Third Embodiment>

A third embodiment according to the start control apparatus of the present invention will be explained with reference to FIG. 9 and FIG. 10. The third embodiment has the same configuration as that of the first embodiment, except that a part of the start control process is different. Therefore, an explanation of the same part as that in the first embodiment will be omitted, as described above, and the same portions as those on the drawing will carry the same reference numerals. Basically, only a different part will be explained with reference to FIG. 9 and FIG. 10.

If a parking range is selected by a shift lever (or selector) (not illustrated), which is one example of the "shift operating device" according to the embodiment, a time point of the start of the rotation of the rotating shaft of the first motor generator and a time point of the start of the rotation of the crankshaft 101 are different due to control such as, for example, gear backlash elimination. If no measures are taken in this case, the rotation of the crankshaft 101 during the gear backlash elimination or the like possibly causes fuel to be injected at unexpected timing. Alternatively, a change in the period from the fuel injection to the ignition possibly causes a difference in air-fuel mixture formation, thereby deteriorating the combustion.

Figure 9A:
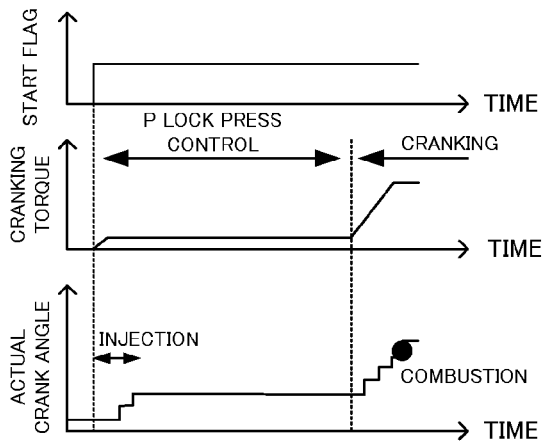
FIG. 9 are conceptual diagrams illustrating one example of cranking in each of a case where a parking range is selected and a case where a drive range is selected.
Figure 10:
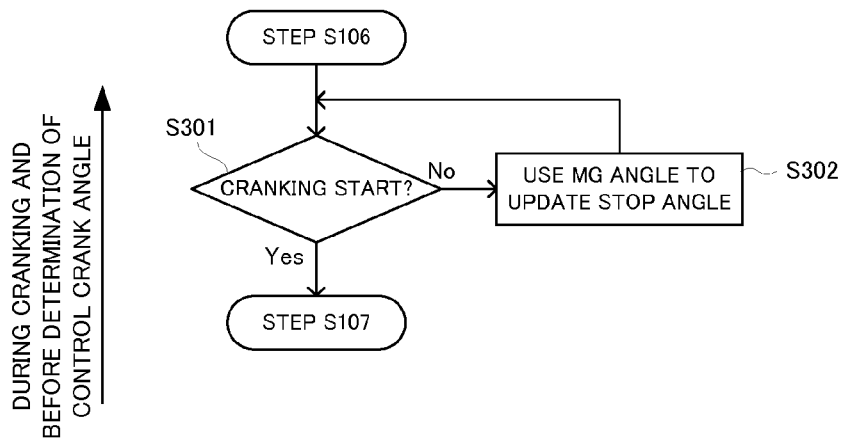
FIG. 10 is a flowchart illustrating a start control process according to a third embodiment.

Specifically, for example, as illustrated in FIG. 9A, if it is configured in such a manner that the fuel injection control is immediately performed at a time point of the reception of the start flag by the engine ECU 21, there is a relatively long period from the fuel injection to the ignition, which deteriorates the combustion.

Figure 9B:
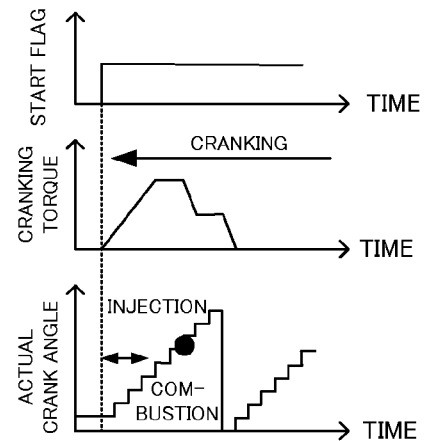

On the other hand, if a drive range is selected by the shift lever, the control such as the gear backlash elimination is not required, and thus, as illustrated in FIG. 9B, there is a relatively short period from the reception of the start flag by the engine ECU 21 to the start of the rotation of the crankshaft 101. There is thus no problem, unlike in the case of the selection of the parking range.

Thus, in the embodiment, if the time point of the start of the rotation of the rotating shaft of the first motor generator and the time point of the start of the rotation of the crankshaft 101 are different due to the power transmission mechanism (or the "power distribution mechanism 13" in the embodiment) located between the crankshaft 101 and the rotating shaft of the first motor generator 11, the crank angle stored as the stop angle is updated on the hybrid ECU 22 on the basis of the rotor angle detected by the resolver 32 after it is required to start the engine 10. The engine ECU 21 then adds the value according to the crank angle sensor signal to the stop angle at the time point of the start of the rotation of the crankshaft 101, thereby calculating the temporary crank angle.

By virtue of such a configuration, even if there is an influence of an element located between the rotating shaft of the first motor generator and the crankshaft 101 such as in the case of the selection of the parking range, it is possible to improve the reliability of the temporary crank angle at the start of the engine 10, which is extremely useful in practice.

A start control process performed by the start control apparatus 100 as configured above will be explained with reference to a flowchart in FIG. 10.

After the process in the step S106 illustrated in FIG. 7, the hybrid ECU 22 determines whether or not the cranking of the engine 10 is started (step S301). If it is determined that the cranking of the engine 10 is not started (the step S301: No), the hybrid ECU 22 updates the stored stop angle on condition that the rotor angle is detected again by the resolver 32 (step S302), and performs the process in the step S301 again. If, however, it is determined that the cranking of the engine 10 is started (the step S301: Yes), the hybrid ECU 22 performs the process in the step S107 illustrated in FIG. 7.

<Fourth Embodiment>

A fourth embodiment according to the start control apparatus of the present invention will be explained with reference to FIG. 11 and FIG. 12. The fourth embodiment has the same configuration as that of the first embodiment, except that a part of the start control process is different. Therefore, an explanation of the same part as that in the first embodiment will be omitted, as described above, and the same portions as those on the drawing will carry the same reference numerals. Basically, only a different part will be explained with reference to FIG. 11 and FIG. 12.

The crank rotor 102 mounted on the crankshaft 101 has the teeth parts 102a formed at intervals of 10 degrees (refer to FIG. 2). Thus, simply speaking, at each time of the detection of the crank angle sensor signal, the temporary angle may be increased by 10 degrees.

Figure 11:
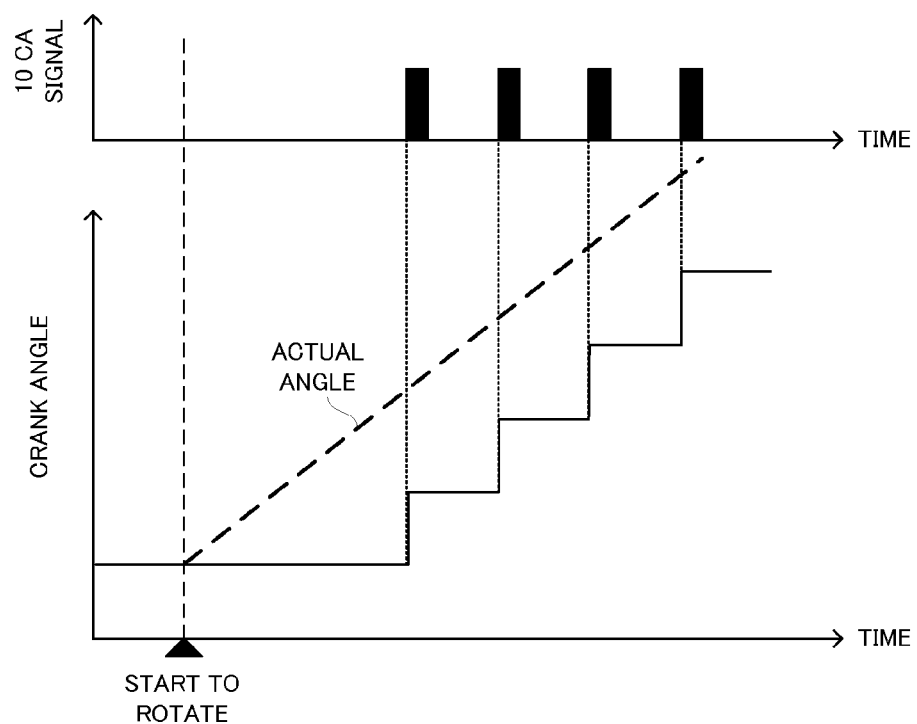
FIG. 11 is a conceptual diagram illustrating one example of a temporary crank angle and an actual crank angle if a stop angle corresponds to a tooth-missing position.
Figure 12:
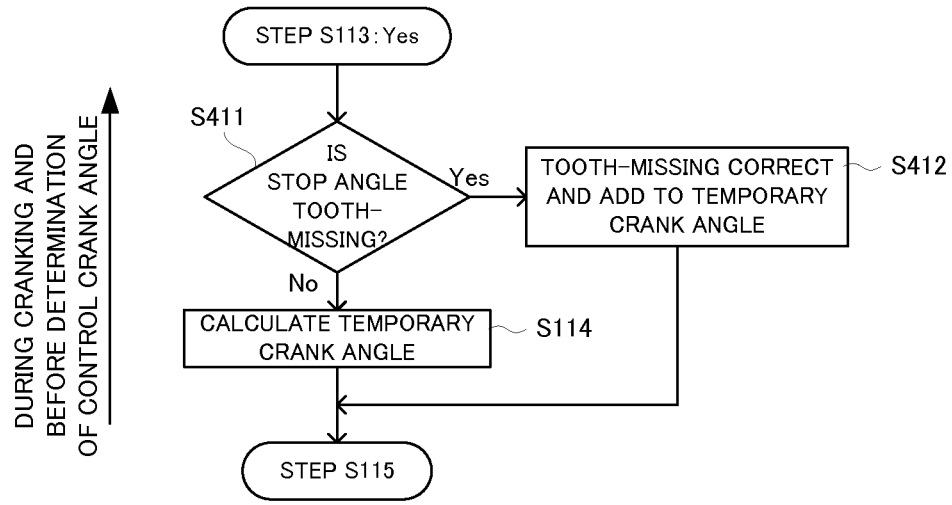
FIG. 12 is a flowchart illustrating a start control process according to a fourth embodiment.

If, however, the tooth-missing part 102b of the crank rotor 102 is opposed to the crank angle sensor 31 at the previous stop of the engine 10, the crankshaft 101 is possibly rotated by 10 degrees or more when the crank angle sensor signal is firstly detected at the present start of the engine 10, as illustrated in FIG. 11. Then, there is possibly deviation between an actual crank angle (refer to a dashed line in a lower part of FIG. 11) and the temporary crank angle (refer to a step-shaped solid line in the lower part of FIG. 11).

Thus, in the embodiment, the value according to the crank angle sensor signal is corrected on the basis of a period from the start of the rotation of the crankshaft 101 to the first detection of the crank angle sensor signal. Specifically, for example, a predetermined correction amount (e.g. 0, 10, 20) is added to 10 degrees on the basis of the period from the start of the rotation of the crankshaft 101 to the first detection of the crank angle sensor signal. This can result in suppression of the deviation between the actual crank angle and the temporary crank angle, which is extremely useful in practice.

A start control process performed by the start control apparatus 100 as configured above will be explained with reference to a flowchart in FIG. 12.

After the determination of "Yes" in the process in the step S113 illustrated in FIG. 7, the engine ECU 21 determines whether or not the stop angle latched in the process in the step S112 (refer to FIG. 7) is an angle corresponding to the tooth-missing part 102b (step S411). If it is determined that the latched stop angle is not the angle corresponding to the tooth-missing part 102b (step S411: No), the engine ECU 21 performs the process in the step S114 illustrated in FIG. 7.

If, however, it is determined that the latched stop angle is the angle corresponding to the tooth-missing part 102b (step S411: Yes), the engine ECU 21 corrects the value according to the crank angle sensor signal and calculates the temporary crank angle on the basis of the period from the start of the rotation of the crankshaft 101 to the first detection of the crank angle sensor signal (step S412), and performs the process in the step S115 illustrated in FIG. 7.

The process in the step S411 may be performed before the process in the step S113, or may be performed in parallel with the process in the step S113.

<Fifth Embodiment>

Figure 13A:
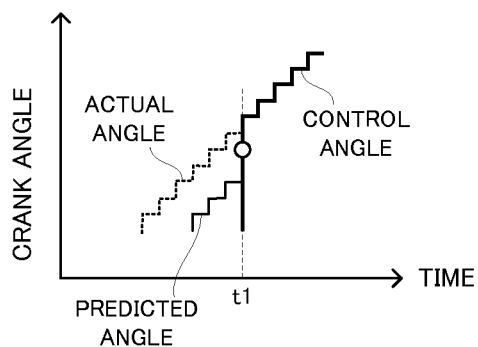
FIG. 13 are conceptual diagrams illustrating one example of the temporary crank angle and the actual crank angle during switching.
Figure 13B:
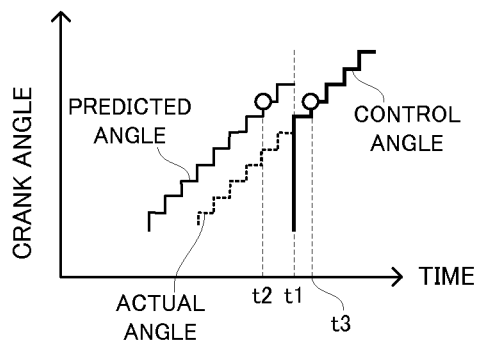
Figure 14:
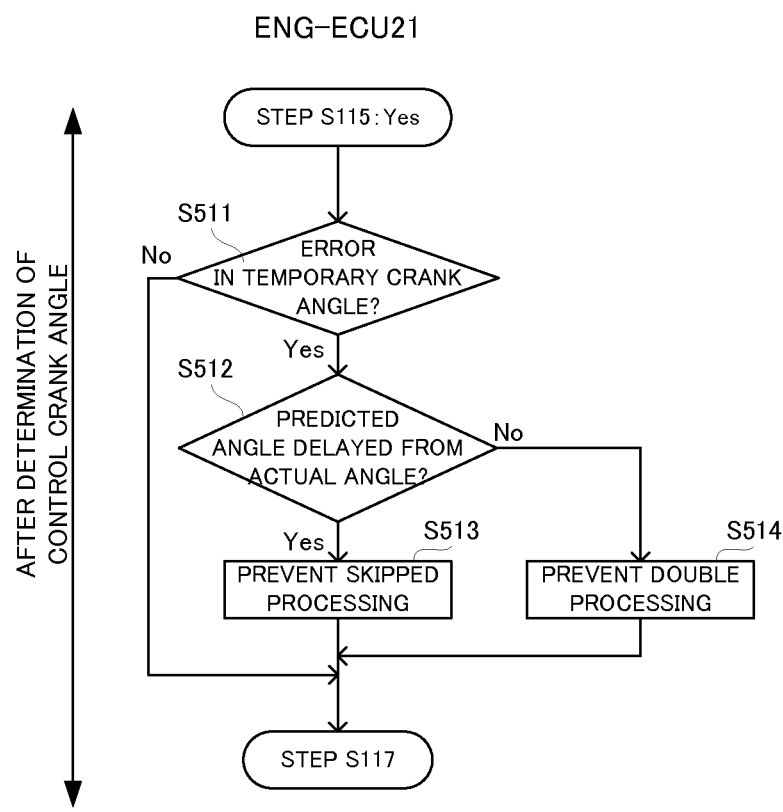
FIG. 14 is a flowchart illustrating a start control process according to a fifth embodiment.

A fifth embodiment according to the start control apparatus of the present invention will be explained with reference to FIG. 13 and FIG. 14. The fifth embodiment has the same configuration as that of the first embodiment, except that a part of the start control process is different. Therefore, an explanation of the same part as that in the first embodiment will be omitted, as described above, and the same portions as those on the drawing will carry the same reference numerals. Basically, only a different part will be explained with reference to FIG. 13 and FIG. 14.

As illustrated in the flowchart in FIG. 7, if the crank angle is determined, the engine ECU 21 performs the start control associated with the engine 10 on the basis of the crank angle instead of the temporary crank angle. Here, if there is an error between the temporary crank angle and the crank angle, switching between the temporary crank angle and the crank angle possibly causes, for example, skipped processing and double processing.

Thus, in the embodiment, if the temporary crank angle is delayed from the crank angle (refer to FIG. 13A), the engine ECU 21 performs the fuel injection control or the ignition control immediately after the switching from the temporary crank angle to the crank angle, on condition that the injection angle to perform the fuel injection control or the ignition angle to perform the ignition control is included between the temporary crank angle and the crank angle.

On the other hand, if the temporary crank angle is advanced from the crank angle (refer to FIG. 13B), the fuel injection control or the ignition control is possibly performed on the basis of the temporary crank angle before the switching from the temporary crank angle to the crank angle. In this case, the engine ECU 21 prohibits the implementation of the fuel injection control and the ignition control based on the crank angle, until the crank angle reaches an angle corresponding to the temporary crank angle when the crank angle is determined.

By virtue of such a configuration, the skipped processing and the double processing caused by the switching between the temporary crank angle and the crank angle, which is extremely useful in practice.

A start control process performed by the start control apparatus 100 as configured above will be explained with reference to a flowchart in FIG. 14.

After the determination of "Yes" in the process in the step S115 illustrated in FIG. 7, the engine ECU 21 determines whether or not there is any error between the temporary crank angle and the crank angle (step S511). If there is no error between the temporary crank angle and the crank angle (or the error is within an allowable range) (the step S511: No), the engine ECU 21 performs the process in the step S117 illustrated in FIG. 7.

If, however, there is the error between the temporary crank angle and the crank angle (the step S511: Yes), the engine ECU 21 determines whether or not the temporary crank angle is delayed from the crank angle (step S512). If it is determined that the temporary crank angle is delayed from the crank angle (the step S512: Yes), the engine ECU 21 performs a skipped processing prevention process (step S513). Specifically, the engine ECU 21 performs the fuel injection control or the ignition control immediately after the switching from the temporary crank angle to the crank angle, on condition that the injection angle or the ignition angle is included between the temporary crank angle and the crank angle.

If, however, it is determined that the temporary crank angle is advanced from the crank angle (the step S512: No), the engine ECU 21 performs a double processing prevention process (step S514). Specifically, the engine ECU 21 prohibits the implementation of the fuel injection control and the ignition control based on the crank angle, until the crank angle reaches the angle corresponding to the temporary crank angle when the crank angle is determined.

<Sixth Embodiment>

A sixth embodiment according to the start control apparatus of the present invention will be explained. The sixth embodiment has the same configuration as that of the first embodiment, except that a part of the start control process is different. Therefore, an explanation of the same part as that in the first embodiment will be omitted, as described above. Basically, only a different part will be explained.

For example, if the fuel injection and the ignition are performed after making negative pressure in the cylinder of the engine 10 or after making high number of revolutions of the engine 10, specifically, for example, if there is a relatively long period of intermittent operation associated with the hybrid vehicle 1, or if a catalyst disposed in an exhaust tube of the engine 10 has a relatively low temperature, or if it is required to reduce emission such as at the start of the operation of the hybrid vehicle 1, then, the engine ECU 21 performs the start control on the basis of the crank angle after the determination of the crank angle, without using the temporary crank angle.

If the temporary crank angle cannot be calculated, such as, for example, immediately after Ready-ON, when a 12V battery (not illustrated) is cleared, if there is a problem in the hybrid ECU 22, and if there is a problem in communication between the engine ECU 21 and the hybrid ECU 22, then, the engine ECU 21 performs the start control on the basis of the crank angle after the determination of the crank angle, without using the temporary crank angle.

The first to sixth embodiments described above may be combined, as occasion demands.

The present invention is not limited to the aforementioned embodiments, but various changes may be made, if desired, without departing from the essence or spirit of the invention which can be read from the claims and the entire specification. A start control apparatus which involves such changes is also intended to be within the technical scope of the present invention.

DESCRIPTION OF REFERENCE NUMERALS 1 vehicle
10 engine
11 first motor generator
12 second motor generator
13 power distribution mechanism
21 engine ECU
22 hybrid ECU
31 crank angle sensor
32, 33 resolver
100 start control apparatus

The invention claimed is:

1. A start control apparatus mounted on a vehicle comprising an internal combustion engine and a motor having a rotating shaft that can be rotated in synchronization with an output shaft of the internal combustion engine, said start control apparatus comprising:

a crank angle sensor mounted on the output shaft and configured to output a signal in association with rotation of the output shaft;

a resolver mounted on the rotating shaft and configured to detect a rotor angle, which is an angle position of the rotating shaft; and a controlling device configured to perform start control associated with the internal combustion engine on the basis of a temporary crank angle, from a start of the internal combustion engine until determination of a crank angle, which is an angle position of the output shaft, when the output shaft is rotated by the motor to start the internal combustion engine, wherein the temporary crank angle is an estimated value calculated by adding a value according to the outputted signal to a stop angle, and the stop angle is an angle based on the rotor angle detected at a previous stop of the internal combustion engine.

2. The start control apparatus according to claim 1, wherein if the output shaft is rotated between the previous stop of the internal combustion engine and a present start of the internal combustion engine, said controlling device updates the stop angle on the basis of a rotor angle detected again by said resolver, and uses the updated stop angle at the present start of the internal combustion engine, thereby calculating the temporary crank angle.

3. The start control apparatus according to claim 1, wherein in a case where a time point of a start of the rotation of the rotating shaft and a time point of a start of the rotation of the output shaft are different due to a power transmission mechanism located between the output shaft and the rotating shaft, said controlling device updates the stop angle on the basis of a rotor angle detected again by said resolver, and adds the value according to the outputted signal to the stop angle at the time point of the start of the rotation of the output shaft, thereby calculating the temporary crank angle.

4. The start control apparatus according to claim 3, wherein the case where the time point of the start of the rotation of the rotating shaft and the time point of the start of the rotation of the output shaft are different due to the power transmission mechanism located between the output shaft and the rotating shaft is a case where a parking range is selected by a shift operating device, which is provided for the vehicle and which is configured to switch between a plurality of ranges including the parking range.

5. The start control apparatus according to claim 1, wherein said controlling device corrects a value according to a first signal outputted, on the basis of a period from a start of the rotation of the output shaft to an output of the first signal from said crank angle sensor.

6. The start control apparatus according to claim 1, wherein
said controlling device performs the start control on the basis of the crank angle instead of the temporary crank angle after the determination of the crank angle, and
if the crank angle is advanced from the temporary crank angle when the crank angle is determined, said controlling device performs fuel injection control or ignition control on condition that an injection angle to perform the fuel injection control included in the start control, or an ignition angle to perform the ignition control included in the start control is included between the temporary crank angle and the crank angle.

7. The start control apparatus according to claim 1, wherein said controlling device performs the start control on the basis of the crank angle instead of the temporary crank angle after the determination of the crank angle, and if the crank angle is delayed from the temporary crank angle when the crank angle is determined, said controlling device prohibits fuel injection control and ignition control, which are included in the start control, until the crank angle reaches an angle corresponding to the temporary crank angle when the crank angle is determined.

8. The start control apparatus according to claim 1, wherein if it is required to reduce emission at the start of the internal combustion engine, said controlling device performs the start control on the basis of the crank angle after the determination of the crank angle, without using the temporary crank angle.

* * * * *